United States Patent [19]
Onodera

[11] Patent Number: 5,862,068
[45] Date of Patent: Jan. 19, 1999

[54] ARITHMETIC CIRCUIT FOR CALCULATING A SQUARE-ROOT OF A SUM OF SQUARES

[75] Inventor: Takashi Onodera, Yotsukaido, Japan

[73] Assignee: Sharp Kabushiki Kaisha, Osaka, Japan

[21] Appl. No.: 850,820

[22] Filed: May 2, 1997

[30] Foreign Application Priority Data

Jun. 5, 1996 [JP] Japan ................................. 8-142696

[51] Int. Cl.⁶ ........................................................ G06F 7/38
[52] U.S. Cl. ......................................................... 364/752
[58] Field of Search ........................ 364/715.011, 718.01, 364/722, 730, 735, 752, 753

[56] References Cited

U.S. PATENT DOCUMENTS

| 4,945,505 | 7/1990 | Wiener et al. ................... 364/715.03 |
| 5,367,702 | 11/1994 | Mahant-Shetti et al. ............ 364/753 |

FOREIGN PATENT DOCUMENTS

| 0103722 A2 | 3/1984 | European Pat. Off. . |
| 07044530 A | 2/1995 | Japan . |

OTHER PUBLICATIONS

Filip, "A Baker's Dozen Magnitude Approximations and Their Detection Statistics", IEEE Transactions On Aerospace And Electronic Systems, Jan. 1976, USA, vol. AES–12, No. 1, ISSN 0018–9251, pp. 86–89, XP002035639.

Dual 64 Tap, 11 Mcps Digital Matched Filter Stel–3340 (Stanford Telecommunications, Inc.) pp. 1–12, 1992.

Primary Examiner—Ohuong Dinh Ngo
Attorney, Agent, or Firm—Nixon & Vanderhye, P.C.

[57] ABSTRACT

An arithmetic circuit with a small number of parts performs high-speed arithmetic operations for calculating a square-root of a sum of squares of two numbers. Absolute values of two inputs $S_{in1}$ and $S_{in2}$ are determined by absolute value calculators and are compared by an absolute value comparator According to the comparison result, a first multiplexer selects the smaller of the two absolute values and a second multiplexer selects the larger of the two absolute values. The smaller absolute value is shifted by a 2-bit right shifter and by a 3-bit right shifter respectively, and the obtained shifted results are added together by a (N–2)-bit adder. The sum of the shifted values is then added by a N-bit adder to the larger absolute value. A square-root of the square-sum of two inputs $S_{in1}$ and $S_{in2}$ is thus approximately determined,

8 Claims, 7 Drawing Sheets

5,862,068

ARITHMETIC CIRCUIT FOR CALCULATING A SQUARE-ROOT OF A SUM OF SQUARES

BACKGROUND OF THE INVENTION

In digital signal processing, e.g., processing used in digital correlator in digital radio-communications, there is frequently conducted such a calculation that two signals are squared; the two squares are summed; and a square-root of the sum is calculated. Several conventional arithmetic circuits for realizing the above-mentioned square-sum root calculation are be described below:

Conventional circuit [I]

A first example of a conventional arithmetic circuit includes (N+1)-bit multipliers for calculating squares of individual input data $S_{in1}$ and $S_{in2}$, a 2N-bit adder for adding together two squares from respective multiplying circuits and a (2N+1)-bit square-root calculator for calculating a square-root of the square-sum and producing an operation result $S_{out}$.

In the thus constructed circuit, inputs Sink and $S_{in2}$ of N+1 bits (N bits+Sign bit) each are inputted and squared respectively by (N+1) multipliers. The obtained products (squares of the input values $S_{in1}$ and $S_{in2}$) are positive, and they each are composed of 2N bits. The squared values $S_{in1}^2$ and $S_{in2}^2$ are input to the 2N-bit adder whereby two squared values are added together to obtain a (2N+1)-bit sum of $S_{in1}^2+S_{in2}^2$. The sum is input to the (2N+1)-bit square-root calculator whereby a square-root of a square-sum $(S_{in1}^2+S_{in2}^2)^{1/2}$ of two inputs $S_{in1}$ and $S_{in2}$ is calculated to obtain a result $S_{out}$. This arithmetic circuit is hereinafter referred to as conventional circuit [I].

Conventional circuit [II]

Another example of conventional arithmetic circuit [II] calculates a square-root of a square-sum by approximation. This circuit comprises N-bit absolute value calculators for determining absolute values of respective inputs $S_{in1}$ and $S_{in2}$, a N-bit-absolute comparator for comparing with each other the absolute values $|S_{in1}|$ and $|S_{in2}|$, N-bit multiplexers for multiplexing the absolute values by using the comparison result as a selecting signal, a N-bit fixed-value multiplier for multiplying an absolute value by a fixed value and a N-bit adder for adding a product to the output of the N-bit multiplexer and outputting a calculation result $S_{out}$. This conventional arithmetic circuit [II] approximately determines a square-root of a square-sum of two inputs $S_{in1}$ and $S_{in2}$ according to the following equation (1).

$$(S_{in1}^2+S_{in2}^2)^{1/2} \cong \max\{|S_{in1}|,|S_{in2}|\}+\min\{|S_{in1}|,|S_{in2}|\}\times (2^{1/2}-1) \quad \text{equation (1)}$$

In the above-mentioned circuit, inputs $S_{in1}$ and $S_{in2}$ are input to respective N-bit absolute value calculators. The obtained absolute values $|S_{in1}|$ and $|S_{in2}|$ are input to a N-bit absolute value comparator whereby they are compared in size. According to the comparison result, the N-bit multiplexer selects the smaller of the two absolute values $|S_{in1}|$ and $|S_{in2}|$ and the other N-bit multiplexer selects the larger of the two absolute values $|S_{in1}|$ and $|S_{in2}|$.

In this instance, the smaller absolute value (i.e., the output of the N-bit multiplexer) is multiplied by a fixed value $(2^{1/2}-1)$ by the fixed-value multiplier and the obtained product is then added to the larger absolute value (i.e., the output of the N-bit multiplexer). The result of an this calculation is outputted as a result $S_{out}$ of approximate calculation of a square-root of a square-sum of two inputs $S_{in1}$ and $S_{in2}$.

Conventional circuit [III]

Japanese Laid-Open Patent Publication 7-44530 discloses another conventional arithmetic circuit according to the above-described equation (1). In contrast to the conventional arithmetic circuit [II] based on the same equation (1), this arithmetic circuit [III] approximates in practice the term $(2^{1/2}-1)$ by $(1+2^2+2^4+2^5)/2^7=0.4140625$. This calculation is conducted by a bit-shift. Accordingly, there is no need of using any multiplier, reducing the size of the circuit. This circuit, however, requires a plurality of clock pulses for obtaining the operation result.

Conventional circuit [IV]

Similarly to the above-mentioned conventional circuit [II], this arithmetic circuit is intended to approximately calculate a square-root of a square-sum of two inputs. Circuit [IV] is composed of N-bit absolute value calculators for determining absolute values of inputs $S_{in1}$ and $S_{in2}$, a N-bit absolute value comparator for comparing the obtained absolute value $|S_{in1}|$ with the obtained absolute value $|S_{in2}|$, N-bit multiplexers to be selected by respective selecting signals according the comparison result, a 1-bit right shifter for shifting the smaller output absolute value of N-bit multiplexers by 1 bit to the right and a N-bit adder for adding the shifting result to the larger output value of the N-bit multiplexers.

The thus constructed conventional arithmetic circuit conducts an approximate calculation of a square-root of a square-sum of two inputs $S_{in1}$ and $S_{in2}$ according to the following equation (2) (cited from a catalogue of digital matched filter STEL-3340 manufactured by Stanford Telecommunications, Inc.).

$$(S_{in1}^2+S_{in2}^2)^{1/2} \cong \max\{|S_{in1}|, |S_{in2}|\}+\tfrac{1}{2}\min\{|S_{in1}|, |S_{in2}|\} \quad \text{equation (2)}$$

In the circuit, inputs $S_{in1}$ and $S_{in2}$ are input to the N-bit absolute value calculators respectively. Absolute values $|S_{in1}|$ and $|S_{in2}|$ obtained by the N-bit absolute value calculators are input to the N-bit absolute comparator which judges which of two absolute values is larger. According to the judgment, the N-bit multiplexer selects the smaller of the two absolute values $|S_{in1}|$ and $|S_{in2}|$ and the other N-bit multiplexer selects the larger.

The smaller absolute value outputted by the N-bit multiplexer is shifted by 1 bit to the right by the 1-bit right shifter. The value obtained by the 1-bit right shifter is then added by the N-bit adder to the larger absolute value outputted by the N-bit multiplexer. This N-bit adder obtains an approximate value $S_{out}$ of a square-root of a square-sum of two inputs $S_{in1}$ and $S_{in2}$.

The above-described conventional arithmetic circuits, however, involve the following problems:

The conventional arithmetic circuit [I] may have a considerably large size since the number of gates of the multipliers and the square-root calculator is increased in proportion with the squared number of bit number M of input data. Furthermore, the multipliers have a large delay time necessary for adding the multiplying products of each digit by the number of digits and the square-root calculator have a slow speed processor according to the adder with adding steps being a ½ of digits and sequential circuit which operates with the clock pulses corresponding to the adding steps.

In comparison with the conventional example [I], the conventional arithmetic circuit [II] operates by an approximating method which may have a reduced number of gates, which is proportional to the squared number of bit number M of input data (with a smaller coefficient of squaring the bit number M). However, it is still large in size. With 8 bits, the number of gates of this conventional circuit [II] is about ½ of that of the conventional circuit [I]. The operating speed is higher than that of the conventional circuit [I].

The conventional arithmetic circuit [III] may perform, with the further reduced number of gates, the same approximate calculation as the conventional circuit [II], but it still requires a plurality of clock pulses for executing its operation (e.g., 20 and several clock-pulses with the bit number M of 8). Consequently, this method can not be used where the real time processing is required.

The conventional arithmetic circuit [IV] uses a further simplified approximate calculation may have the considerably reduced number of gates as compared with the circuits [I] and [II] to the extent that the number of gates is proportional to the number M of bits (e.g., ⅓ of that of the conventional circuit [II] at M=8). This arithmetic circuit requires no multiplier nor square calculator as used in circuit [II]. Consequently, it can operate at an increased speed. However, this conventional arithmetic circuit [IV] has a large error of approximation and has, therefore, a low accuracy of calculation.

Errors arise from the two approximating operations made by the conventional circuits [II] and [IV] from the theoretical values when an input $S_{in1}$ is changed from 0 to 100 with a input $S_{in2}$ fixed at 50. The theoretical values shows that the conventional arithmetic circuit [II] of smaller error of approximation has a large size whereas the conventional arithmetic circuit [IV] of smaller size has a large error of approximation. Accordingly, both circuits can not be compatible with each other. The conventional arithmetic circuit [III] has a small size but requires a plurality of clock pulses for its operation that is unusable for real time data processing.

SUMMARY OF THE INVENTION

The present invention relates to an arithmetic circuit for calculating a square-sum root of two respective values in the field of digital signal processing.

The present invention was made to solve the above-mentioned problems involved in the conventional arithmetic circuits for calculating a square root of a square-sum.

An object of the present invention is to provide an arithmetic circuit for calculating a square-root of a sum of squares. The circuit comprises a first and second absolute value calculators for determining absolute values of respective input signals, an absolute value comparator for comparing the two absolute values, a first multiplexer for outputting the smaller of the two absolute values determined by the first and second absolute value calculators by using the result of comparison result made by the absolute comparator as a selecting signal, a second multiplexer for outputting the larger of the two absolute values determined by the first and second absolute value calculators by using the comparison result made by the absolute comparator as a selecting signal, a plurality of multiplies each for multiplying an output of the first multiplexer by ½ raised to a different power, a first adder for adding together outputs of a plurality of multiplying means and a second adder for adding an output of the first adder to an output of the second multiplexer.

In the arithmetic circuit thus constructed, the multipliers are realized simply by a bit-shift operation that can be realized only by changing wiring. Consequently, the operation time is a delay time of wiring and it is realized with no clock pulse. Accordingly, in comparison with the conventional arithmetic circuit [II], this arithmetic circuit has the same level error characteristic, is smaller in size owing to omitting a N-bit fixed multiplier and attains a considerably improved operation speed.

Another object of the present invention is to provide an arithmetic circuit which is constructed as mentioned above and further characterized in that each of the multiplying means determines an approximate value by shifting away lower N bits of a product. The multiplier cuts away J number of lower order bits. Consequently, the multiplier can operate faster without impairing error characteristic as compared with the conventional arithmetic circuits.

Another object of the present invention is to provide an arithmetic circuit which further includes a product-sum calculator for finding an error adjustment term by (1) multiplying optionally paired bits of the output value of first multiplexer (in response to a maximal number N multiplied by ½ raised to nth power) and then by (2) adding together respective products. A first adder add together outputs of the plural multiplying means and an output of the product-sum calculating means and a second adder adds an output of the first adder to the output of the second multiplexer.

Similarly to the square-sum square-root determining arithmetic circuit mentioned (1) above, this arithmetic circuit realizes multipliers simply by a bit-shift that is realized in practice only by changing wiring. The addition of the product-sum calculation makes it possible to further reduce an error in case when two inputs have both small absolute values. Consequently, this arithmetic circuit in comparison with the conventional arithmetic circuits can operate faster without impairing its error characteristic. The product-sum calculating means can be realized by using an AND-circuit and an OR-circuit. Accordingly, its operating time is only a gate delay time that is realized with no clock pulse.

PREFERRED EMBODIMENTS OF THE INVENTION

Prior to explaining preferred embodiment of the present invention, prior art arithmetic circuit for calculating a square-root of a sum of squares will be described below as references for the present invention.

Conventional circuit [I]

Figure 1:
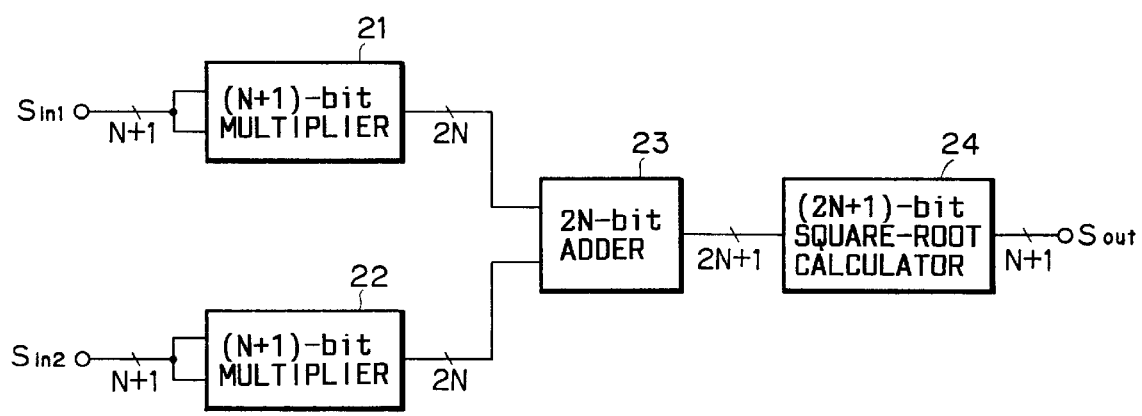
FIG. 1 is an electrical circuit block-diagram of a conventional arithmetic circuit for calculating a square-sum square root.

In FIG. 1, there is shown an example of conventional arithmetic circuit which includes (N+1)bit multipliers 21 and 22 for calculating squares of individual input data $S_{in1}$ and $S_{in2}$, a 2N-bit adder 23 for adding together two squares from respective multiplying circuits 21 and 22 and a (2N+1)-bit square-root calculator 24 for calculating a square-root of the square-sum and for producing a operation result $S_{out}$.

In the thus constructed circuit, inputs $S_{in1}$ and $S_{in2}$ of N+1 bits (N bits+Code bit) each are inputted and squared respectively by (N+1) multipliers 21 and 22. The obtained products (squares of the input values $S_{in1}$ and $S_{in2}$) are positive, and each product is composed of 2N bits. The squared values $S_{in2}$ and $S_{in2}$ are input to the 2N-bit adder 23 whereby two squared values are added together to obtain a (2N+1)-bit sum of $S_{in1}^2 + S_{in2}^2$. The sum is input to the (2N+1)-bit square-root calculator 24 whereby a square-root of a square-sum $(S_{in1}^2 + S_{in2}^2)^{1/2}$ of two inputs $S_{in1}$ and $S_{in2}$ are calculated to obtain a result $S_{out}$. This arithmetic circuit is hereinafter referred to as conventional circuit [I].

Conventional circuit [II]

Figure 2:
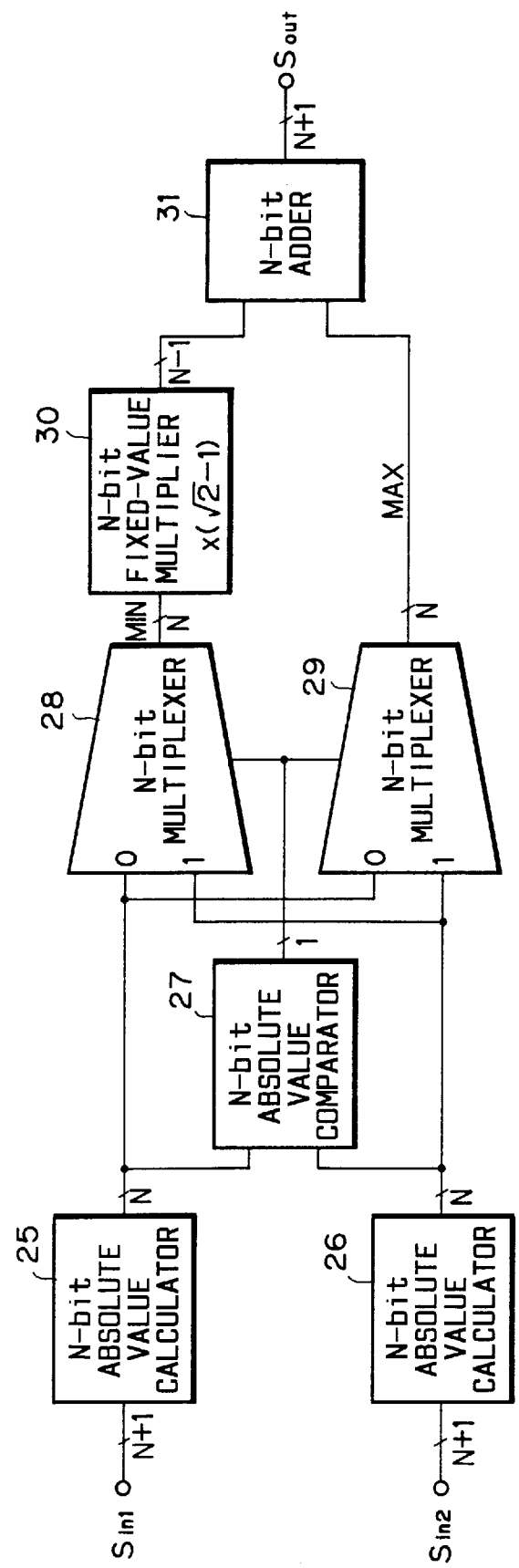
FIG. 2 is an electrical circuit block-diagram of another conventional arithmetic circuit for calculating a square-sum square-root.

In FIG. 2, there is shown another example of conventional arithmetic circuit [II] which calculates a square-root of a square-sum by approximation. This circuit comprises N-bit absolute value calculators 25 and 26 for determining absolute values of respective inputs $S_{in1}$ and $S_{in2}$, a N-bit-absolute comparator 27 for comparing with each other the absolute values $|S_{in1}|$ and $|S_{in2}|$, N-bit multiplexers 28 and 29 for multiplexing the absolute values by using the comparison result as a selecting signal, a N-bit fixed-value multiplier 30 for multiplying an absolute value by a fixed value and a N-bit adder 31 for adding a product to the output of the N-bit multiplexer 29 and outputting a calculation result $S_{out}$. This conventional arithmetic circuit [III] approximately determines a square-root of a square-sum of two inputs $S_{in1}$ and $S_{in2}$ according to the following equation (1).

$$(S_{in1}^2 + S_{in2}^2)^{1/2} \approx \max\{|S_{in1}|, |S_{in2}|\} + \min\{|S_{in1}|, |S_{in2}|\} \times (2^{1/2}-1) \quad \text{equation (1)}$$

In the above-mentioned circuit, inputs $S_{in1}$ and $S_{in2}$ are input to respective N-bit absolute value calculators 25 and 26. The obtained absolute values $|S_{in1}|$ and $|S_{in2}|$ are input to a N-bit absolute value comparator 27 whereby they are compared in size. According to the comparison result, the multiplexer 28 selects the smaller of the two absolute values $|S_{in1}|$ and $|S_{in2}|$ and the N-bit multiplexer 29 selects the larger of the two absolute values $|S_{in1}|$ and $|S_{in2}|$.

In this instance, the smaller absolute value (i.e., the output of the N-bit multiplexer 28) is multiplied by a fixed value $(2^{1/2}-1)$ by the fixed-value multiplier 30 and the obtained product is then added to the larger absolute value (i.e., the output of the N-bit multiplexer 29). The result of the this calculation is outputted as a result Sout of approximate calculation of a square-root of a square-sum of two inputs $S_{in1}$ and $S_{in2}$.

Conventional circuit [III]

Japanese Laid-Open Patent Publication 7-44530 discloses another conventional arithmetic circuit according to the above-described equation (1). In contrast to the conventional arithmetic circuit [II] based on the same equation (1), this arithmetic circuit [III] approximates in practice the term $(2^{1/2}-1)$ by $(1+2^2+2^4+2^5)/2^7 = 0.4140625$. This calculation is conducted by a bit-shift. Accordingly, there is no need of using any multiplier, realizing saving in size of the circuit. This circuit, however, requires a plurality of clock pulses for obtaining the operation result.

Conventional circuit [IV]

Figure 3:
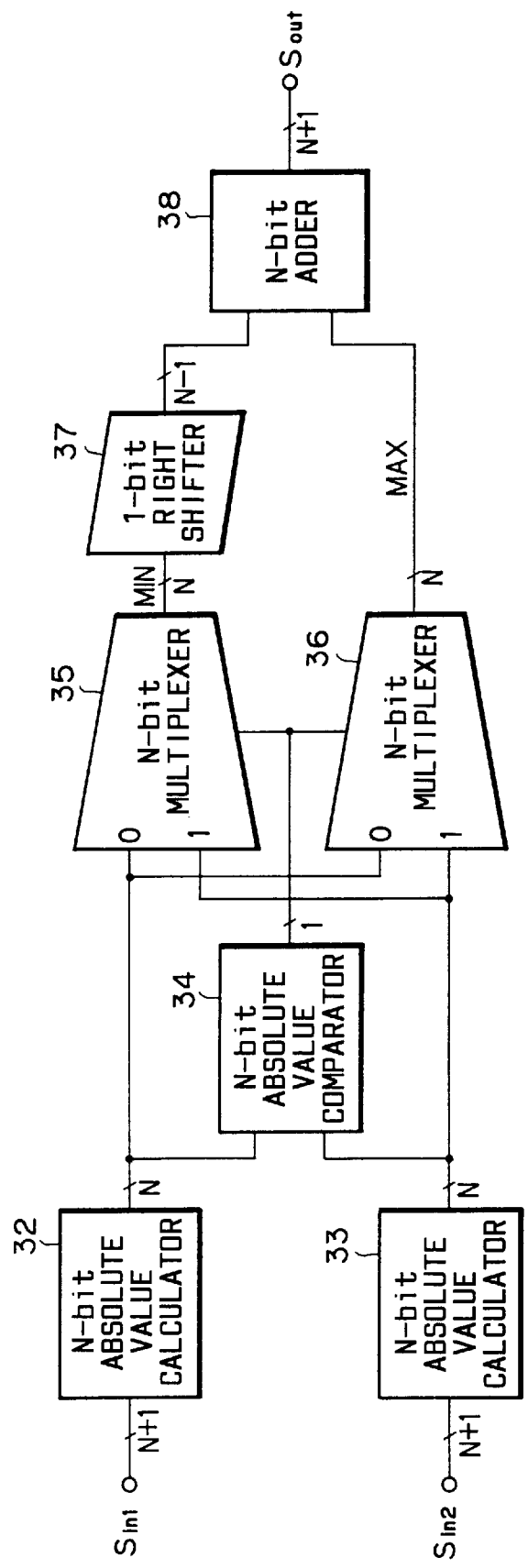
FIG. 3 is an electrical circuit block-diagram of a further conventional arithmetic circuit for calculating a square-sum square-root.

Similarly to the above-mentioned conventional circuit [II], this arithmetic circuit is intended to approximately calculate a square-root of a square-sum of two inputs, which is, as shown in FIG. 3, composed of N-bit absolute value calculators 32, 33 for determining absolute values of inputs $S_{in1}$ and $S_{in2}$, a N-bit absolute value comparator 34 for comparing the obtained absolute value $|S_{in1}|$ with the obtained absolute value $|S_{in2}|$, N-bit multiplexers 35 and 36 to be selected by respective selecting signals according the comparison result, a 1-bit right shifter 37 for shifting the smaller output absolute value of N-bit multiplexers by 1 bit to the right and a N-bit adder 38 for adding the shifting result to the larger output value of the N-bit multiplexers 36.

The thus constructed conventional arithmetic circuit performs an approximate calculation of a square-root of a square-sum of two inputs $S_{in1}$ and $S_{in2}$ according to the following equation (2) (cited from a catalogue of digital matched filter STEL-3340 manufactured by Stanford Telecommunications, Inc.).

$$(S_{in1}^2 + S_{in2}^2)^{1/2} \approx \max\{|S_{in1}|, |S_{in2}|\} + \tfrac{1}{2}\min\{|S_{in1}|, |S_{in2}|\} \quad \text{equation (2)}$$

In the circuit shown in FIG. 3, inputs $S_{in1}$ and $S_{in2}$ are input to the N-bit absolute value calculators 32 and 33 respectively. Absolute values $|S_{in1}|$ and $|S_{in2}|$ obtained by the N-bit absolute value calculators 32 and 33 are input to the N-bit absolute comparator 34 which judges which of two absolute values is larger. According to the judgment, the N-bit multiplexer 35 selects the smaller of the two absolute values $|S_{in1}|$ and $|S_{in2}|$ and the other N-bit multiplexer 36 selects the larger.

The smaller absolute value outputted by the N-bit multiplexer 35 is shifted by 1 bit to the right by the 1-bit right shifter 37. The value obtained by the 1-bit right shifter 37 is then added by the N-bit adder 38 to the larger absolute value outputted by the N-bit multiplexer 35. This N-bit adder 38 obtains an approximate value $S_{out}$ of a square-root of a square-sum of two inputs $S_{in1}$ and $S_{in2}$.

The above-described conventional arithmetic circuits, however, involve the following problems:

The conventional arithmetic circuit [I] may have a considerably large size since the number of gates of the multipliers and the square-root calculator is increased in proportion with the squared number of bit number M of input data. Furthermore, the multipliers have a large delay time necessary for adding the multiplication products of each digit by the number of digits and the square-root calculator has a slow speed processor according to the adder with adding steps being a ½ of digits and sequential circuit which operates with the clock pulses corresponding to the adding steps.

In comparison with the conventional example [I], the conventional arithmetic circuit [II] operates by an approximating method which may have a reduced number of gates, which is proportional to the squared number of bit number M of input data (with a smaller coefficient of squaring the bit number M). However, it is still large in size. With 8 bits, the number of gates of this conventional circuit [II] is about ½ of that of the conventional circuit [I]. The operating speed is higher than that of the conventional circuit [I].

The conventional arithmetic circuit [III] may perform, with the further reduced number of gates, the same approximate calculation as the conventional circuit [II], but it still requires a plurality of clock pulses for executing its operation (e.g., 20 and several clock-pulses with the bit number M of 8). Consequently, this method can not be used where the real time processing is required.

The conventional arithmetic circuit [IV] uses a further simplified approximate calculation may have the considerably reduced number of gates as compared with the circuits [I] and [II] to the extent that the number of gates is proportional to the number M of bits (e.g., ⅓ of that of the conventional circuit [II] at M=8). This arithmetic circuit requires no multiplier nor square calculator as used in circuit [II]. Consequently, it can operate at an increased speed. However, this conventional arithmetic circuit [IV] has a large error of approximation and has, therefore, a low accuracy of calculation.

Figure 4:
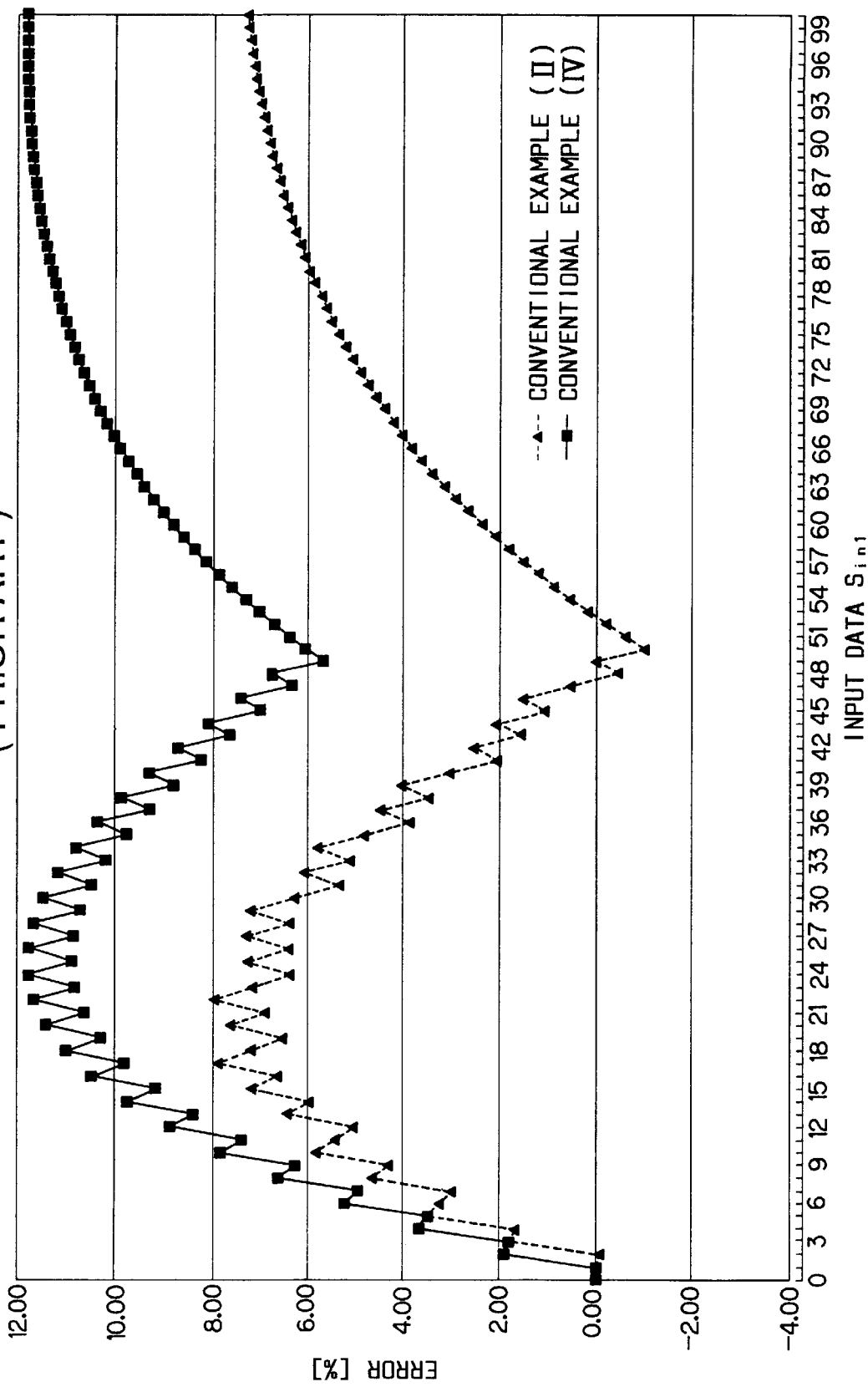
FIG. 4 is a graph showing, in comparison, the errors of approximating calculations conducted by conventional square-sum square-root calculating arithmetic circuits.

FIG. 4 is a graph showing errors of two approximating operations made by the conventional circuits [II] and [IV]. In FIG. 4, there are shown errors from the theoretical values when an input $S_{in1}$ is changed from 0 to 100 with a input $S_{in2}$ fixed at 50. The graph shows that the conventional arithmetic circuit [II] of smaller error of approximation has a large size whereas the conventional arithmetic circuit [IV] of smaller size has a large error of approximation. Accordingly, both circuits can not be compatible with each other. The conventional arithmetic circuit [III] has a small size but requires a plurality of clock pulses for its operation that is unusable for real time data processing.

Figure 5:
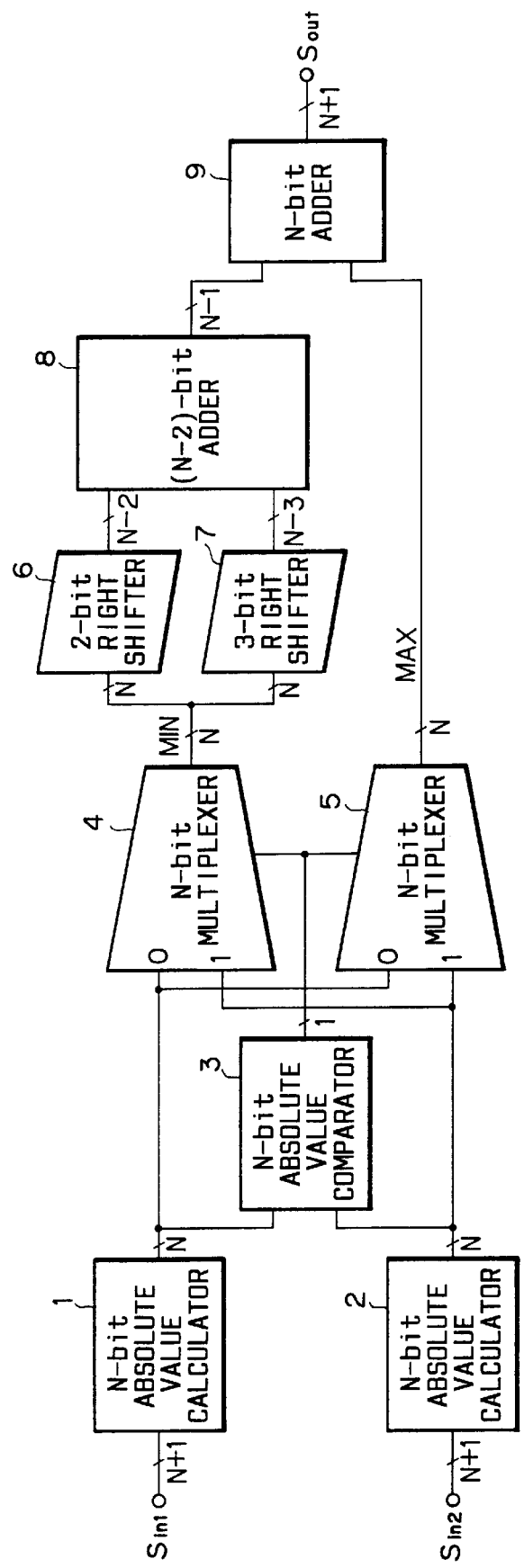
FIG. 5 is an electrical circuit block-diagram of a square-sum square-root calculating arithmetic circuit according to a first embodiment of the present invention.

Preferred embodiments of the present invention will be described below in detail with reference to accompanying drawings. FIG. 5 shows an electrical block diagram of an arithmetic circuit for calculating a square-root of a sum of squares (square-sum), which is a first embodiment of the present invention. This arithmetic circuit for calculating a square-root of a sum of squares comprises first and second N-bit absolute value calculators 1 and 2 for calculating absolute values of respective input data $S_{in1}$ and $S_{in2}$, a N-bit absolute value comparator 3 for comparing with each other two absolute values $|S_{in1}|$ and $|S_{in2}|$ outputted by the first and second absolute value calculators 1 and 2, first and second N-bit multiplexers 4 and 5 using the comparison results outputted by the comparator 3 as selecting signals, a 2-bit right shifter 6 for shifting an output of the multiplexer 4 by 2 bits to the right, a 3-bit right shifter 7 for shifting an output of the N-bit-multiplexer 4 by 3 bits to the right, and a (N−2)-bit adder for summing these two shifting results outputted by the shifter 6 and 7 and a N-bit adder 9 for adding the output of the adder 8 to the output of the second N-bit multiplexer 5 and outputting a sum from the N-bit adder 9 as an operation result $S_{out}$.

The operation of the thus constructed arithmetic circuit according to the first embodiment of the present invention is as follows:

Input data $S_{in1}$ and $S_{in2}$ from input terminals are input to the first and second N-bit absolute value calculators 1 and 2 respectively, which in turn calculate and output respective absolute values $|S_{in1}|$ and $|S_{in2}|$ of the input data. The N-bit absolute value comparator 3 receives the two absolute values, compares with each other the absolute values and judges which is larger and which is smaller.

At the same time, the first and second N-bit multiplexers 4 and 5 receive the judgment result signal from the comparator 4 as a selecting signal, and select the smaller and the larger, respectively, of the two absolute values $|S_{in1}|$ and $|S_{in2}|$. The smaller absolute value outputted by the N-bit first multiplexer 4 is shifted by 2 bits to the right by the 2-bit right shifter 6. Namely, it is multiplied by ½ raised to the second power to produce a ¼-fold absolute value.

The smaller absolute value is also shifted by 3 bits to the right. Namely, it is multiplied by ½ raised to the third power to produce a ⅛-fold absolute value. These two products are added together by the (N−2)-bit adder 8. The product-sum is added by the N-bit adder 9 to the larger absolute value outputted by the N-bit multiplexer 5. An approximate calculation result $S_{out}$ is outputted therefrom as a square root of a square-sum of the input signals $S_{in1}$ and $S_{in2}$. The above-mentioned square-sum square-root calculating arithmetic circuit (the first embodiment of the present invention) can execute the following equation (3) where K is equal to Zero in this first embodiment.

$$(S_{in1}^2+S_{in2}^2)^{1/2} \cong \max\{|S_{in1}|, |S_{in2}|\}+(½^2)\min\{|S_{in1}|, |S_{in2}|\}+ (½^3)\min\{|S_{in1}|, |S_{in2}|\}+K \qquad \text{equation (3)}$$

Figure 6:
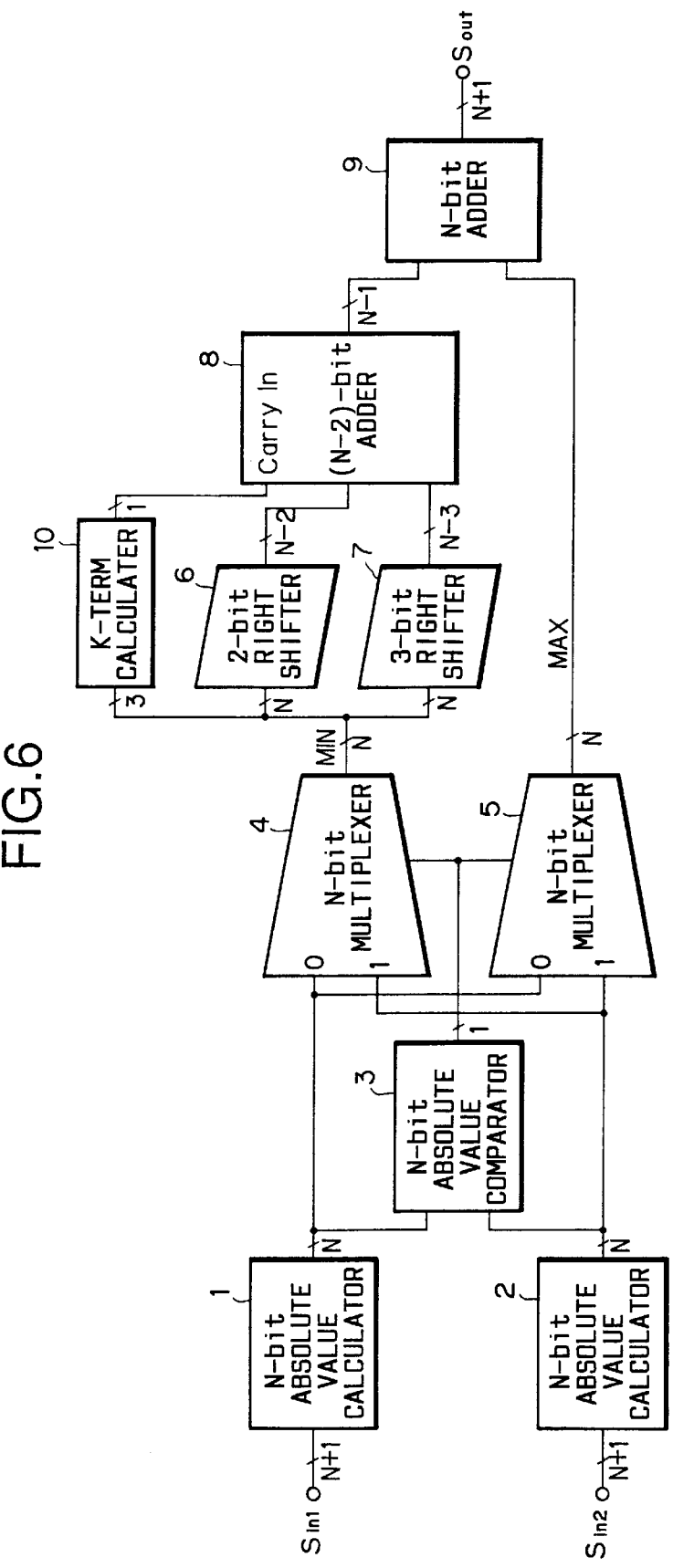
FIG. 6 is an electrical circuit block-diagram of a square-sum square-root calculating arithmetic circuit according to a second embodiment of the present invention.
Figure 7:
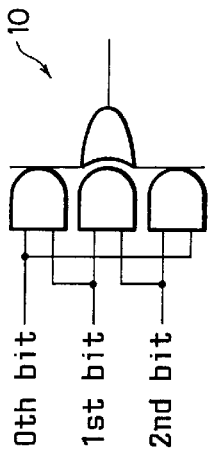
FIG. 7 is an electric circuit diagram of a K-term calculator of the arithmetic circuit according to the second-embodiment of the present invention.

Referring to FIG. 6, a second embodiment of the present invention will be described below. This embodiment differs from the first embodiment in that an additionally provided K-term calculator 10 performs operations on lower 3 bits of the output of the first N-bit multiplexer 4 and outputs its operation result to a carry-in input terminal of the (N−2)-bit adder 8 that in turn adds the received operation result to the sum of products from the 2-bit right sifter 6 and the 3-bit right shifter 7. As shown in FIG. 7, the K-term calculator 10 receives lower three bits of the output of the first N-bit multiplexer 4, determines a logical product of the lowest bit (0th bit) by the first bit, a logical product of the first bit by the second bit and a logical product of the 0th bit by the second bit, calculates a logical sum of the three logical products and outputs the obtained logical sum of the three logical products.

The operation of the above-mentioned arithmetic circuit (the second embodiment of the present invention) is basically similar to the first embodiment of FIG. 5 and differs therefrom particularly in the following points:

In the second embodiment, the K-term calculator 10 receives lower three bits of the smaller absolute value outputted by the first N-bit multiplexer 4 and calculates an error adjustment term K (in Equation (3)) according to the equation (4) described below. The result of calculation made by the K-term calculator 10 according to Equation (4) is added by the (N−2)-bit adder 8 to a sum of products obtained by the 2-bit right shifter 6 and the 3-bit right shifter 7. The described above calculation is added to the calculating process of the first embodiment.

In the second embodiment, K in Equation (3) has the following expression (Equation (4)) if the lower three bits of min $\{|S_{in1}|, |S_{in2}|\}$ in Equation (3) are expressed by b0, b1 and b2. In Equation (4), operators "·" and "+" in the second term denote logical product and logical sum respectively.

$$K = b2 \cdot b1 + b1 \cdot b0 + b0 \cdot b2 \qquad (4)$$

The error adjustment term K in Equation (3) is a term that reduces an error from a theoretical value in such a particular case when both absolute values of two inputs $S_{in1}$ and $S_{in2}$ are small. This term K is added if needed.

The above-mentioned error adjustment term K takes 0 or 1, depending upon a value of lower bits lost by performing operations by 2-bit right shifter 6 and 3-bit right shifter 7, namely, to be cut away (e.g., removed by shifting out). In practice, the error adjustment term K in Equation (4) is 1 and 0 when a sum of a decimal fraction of a product obtained by multiplying a smaller absolute value by (½²) (corresponding to lower two bits to be lost by shifting by two bits to the right in the 2-bit right shifter 6) and a decimal fraction of a product obtained by multiplying a smaller absolute value by (½³) (corresponding to lower three bits to be lost by shifting by three bits to the right in the 3-bit right shifter 7) exceeds 0.5 and not more than 0.5, respectively.

In the above-described arithmetic circuits embodying the present invention a, multiplication circuit for multiplying by ½ raised to nth power is realized simply by a bit-shift operation that can be realized in practice only by changing wiring. The operation time is only a delay of wiring and can be realized without clock pulse and gate.

Figure 8:
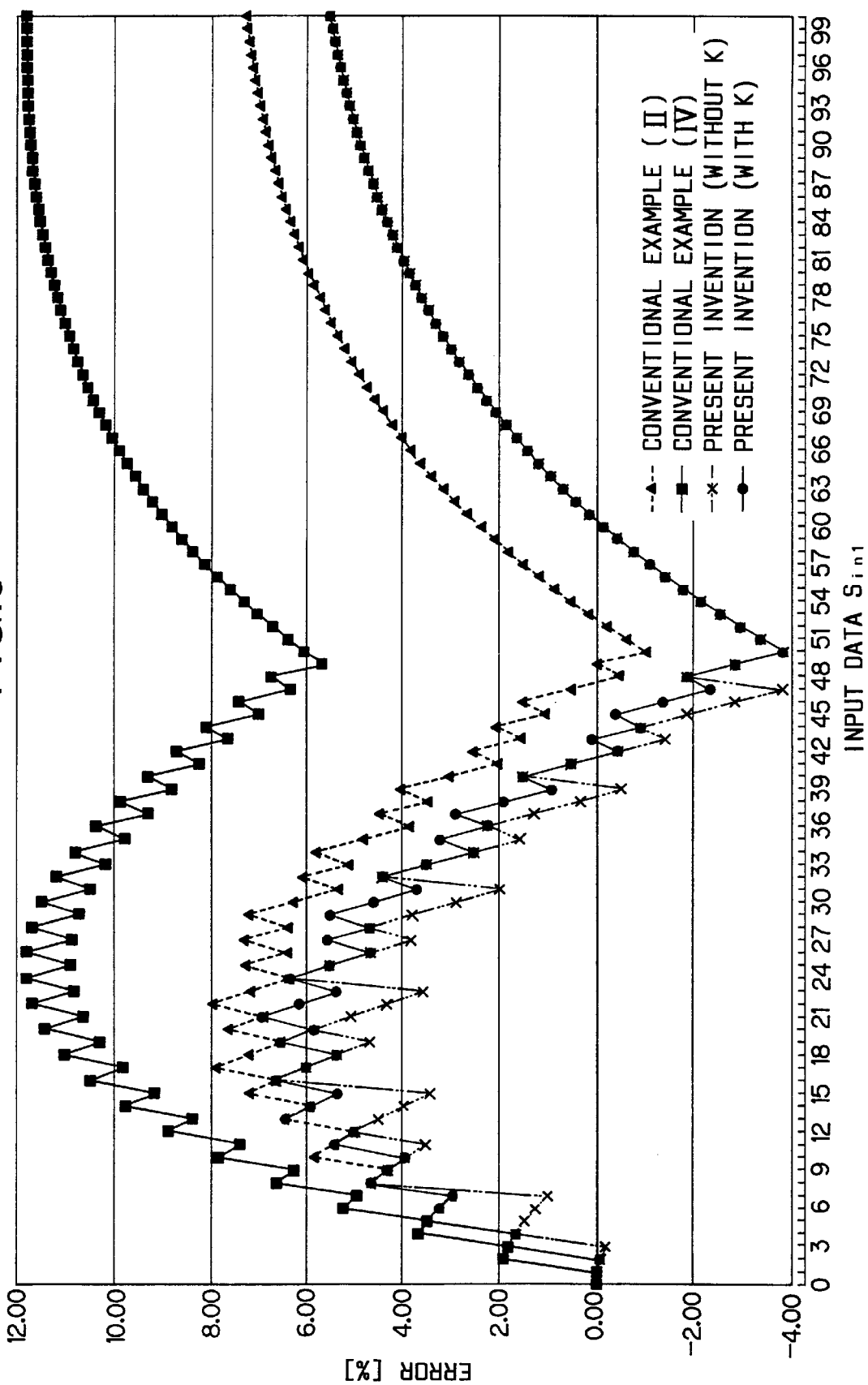
FIG. 8 is a graph showing, in comparison, errors of approximating calculations conducted by conventional square-sum-root arithmetic circuits and by the arithmetic circuits according to the present invention.

The product-sum calculating circuit for determining an error adjustment term K is realized simply by AND and OR circuits. The operation time is a gate delay time without clock pulse. FIG. 8 shows errors of approximating calculations made by two above-described conventional methods and errors of approximating calculations according to the present invention. In FIG. 8, there are shown errors (deviations) from the theoretical values when an input $S_{in1}$ is changed from 0 to 100 with an input $S_{in2}$ fixed at 50.

In comparison with the conventional circuit [II], the square-sum square-root calculating circuits according to the present invention have the same level of error characteristics, are smaller in size by omitting a N-bit fixed-value multiplier, and can operate at an increased speed. The number of gates is reduced by 40% as compared with the conventional circuit [II] when the number M of bits is 8.

In comparison with the conventional circuit [III] disclosed in Japanese Laid-Open Patent Publication No. 7-44530, which requires several tens of clock-pulses for producing a result of its operation, the arithmetic circuits according to the present invention can operate at a high speed with no clock-pulse.

In comparison with the conventional circuit [IV], the arithmetic circuits according to the present invention have considerably improved error characteristics and a minimum increased size of its circuitry. The second embodiment of the present invention as compared with the conventional circuit [IV] has an increase in the number of gates for the (N−2)-bit adder 8 and K-calculator 10 since the fixed-bit shifters do not use any gate in practice. The increase is about ⅙ when M=8.

(1) A square-sum square-root calculating circuit according to the present invention comprises a first and second absolute value calculator for calculating absolute values of respective input signals, an absolute value comparator for comparing with each other two absolute values, a first multiplexer for outputting the smaller of the two absolute values determined by the first and second absolute value calculator according to the result of comparison made by the absolute value comparator, a second multiplexer for outputting the larger of the two absolute values determined by the first and second absolute value calculator according to the result of comparison made by the absolute comparator, a plurality of multiplication means each for multiplying an output of the first multiplexer by ½ raised to a different power, a first adder for adding together outputs of a plurality of multiplication means and a second adder for adding an output of the first adder to an output of the second multiplexer.

In the arithmetic circuit of this construction, the multiplying means are realized simply by a bit-shift operation that can be realized only by changing wiring. Consequently, the operation time is a delay time of wiring and it is realized with no clock-pulse. Accordingly, in comparison with the conventional arithmetic circuit [II] shown in FIG. 2, this arithmetic circuit has the same level of error characteristics, is smaller in size owing to omitting a N-bit fixed multiplier and attains a considerably increased operation speed.

(2) Another square-sum square-root calculating circuit according to the present invention mentioned (1) above is further characterized in that each of the multiplication means determines an approximate value by cutting away lower N bits of a product. The multiplying means cut away lower N-bits. Consequently, the arithmetic circuit can operate faster without impairing its error characteristics in comparison with the conventional arithmetic circuits.

(3) Another square-sum square-root calculating circuit according to the present invention comprises a first and second absolute value calculators for calculating absolute values of respective input signals, an absolute value comparator for comparing with each other two absolute values, a first multiplexer for outputting the smaller of the two absolute values determined by the first and second absolute value calculators by using the result of comparison made by the absolute comparator as a selecting signal, a second multiplexer for outputting the larger of the two absolute values determined by the first and second absolute value calculators by using the result of comparison made by the absolute value comparator as a selecting signal, a plurality of multiplication each for multiplying an output of the multiplexer by ½ raised to a different power, a product-sum calculating means for finding an error adjustment term by multiplying by each other optionally paired J number of lower order bits in the output of the first multiplexer (in response to a maximal number N multiplied by ½ raised to nth power), and then by adding together respective products, a first adder for adding together outputs of the plural multiplication means and an output of the product-sum calculating means and a second adder for adding an output of the first adder to the output of the second multiplexer.

The square-sum square-root determining arithmetic circuit mentioned above realizes multiplying means only by a bit-shift operation that is realized in practice only by changing wiring. The addition of the product-sum calculating means makes it possible to further reduce an error in case when two inputs have both small absolute values. Consequently, this arithmetic circuit in comparison with the conventional arithmetic circuits can operate faster without impairing its error characteristic. The product-sum calculating means can be realized by using an AND-circuit and an OR-circuit. Accordingly, its operating time is only a gate delay time that is realized with no clock pulse.

I claim:

1. An arithmetic circuit for calculating a square-root of a sum of squares, the circuit comprising:

first and second absolute value calculators for calculating absolute values of individual input signals, an absolute value comparator for comparing the two absolute values, a first multiplexer for outputting a smaller of the two absolute values calculated by the first and second absolute value calculators by using a comparison result made by tie absolute value comparator as a selecting signal, a second multiplexer for outputting a larger of the two absolute values calculated by the first and second absolute value calculators by using the comparison result made by the absolute comparator as a selecting signal, a plurality of multipliers, each for multiplying an output of the first multiplexer by ½ raised to a different power, a first adder for adding together outputs of the plurality of multipliers, and a second adder for adding together an output of the first adder and an output of the second multiplexer.

2. The arithmetic circuit of claim 1, wherein each of the multipliers calculates an approximate value by removing a number of lower order bits of a product in accordance with the power to which ½ is raised.

3. The arithmetic circuit of claim 2, wherein a first multiplier of the plurality of multipliers multiplies the output of the first multiplier by ½ raised to a power $n_1$;

a second multiplier of the plurality of multipliers multiplies the output of the first multiplier by ½ raised to a power $n_2$.

4. The arithmetic circuit of claim 2, wherein the power $n_1$ is 2 and the power $n_2$ is 3.

5. The arithmetic circuit of claim 1, wherein a first multiplier of the plurality of multipliers multiplies the output of the first multiplier by ½ raised to a power $n_1$;

a second multiplier of the plurality of multipliers multiplies the output of the first multiplier by ½ raised to a power $n_2$.

6. The arithmetic circuit of claim 5, wherein the power $n_1$ is 2 and the power $n_2$ is 3.

7. An arithmetic circuit for calculating a square-root of a sum of squares, the circuit comprising;

first and second absolute value calculators for calculating absolute values of individual input signals, an absolute value comparator for comparing the two absolute values, a first multiplexer for outputting a smaller of the two absolute values calculated by the first and second absolute value calculators by using a comparison result made by the absolute value comparator as a selecting signal, a second multiplexer for outputting a larger of the two absolute values calculated by the first and second absolute value calculators by using the comparison result made by the absolute comparator as a selecting signal, a plurality of multipliers each for multiplying an output of the first multiplexer by ½ raised to a different power, a product-sum calculator for finding an error adjustment term by (1) multiplying optionally paired bits of the output of the first multiplexer and then by 2 adding together respective products, a first adder for adding together outputs of the plurality of multiplier and an output of the product-sum calculator, and a second adder for adding together an output of the first adder and an output of the second multiplexer.

8. The arithmetic circuit of claim 7, wherein the product-sum calculator multiplies the optionally paired lower bits of the output of the output of the first multiplier in response to a maximal number of digits to be multiplied by ½ raised to a power.

* * * * *